(12) United States Patent
Zhao (10) Patent No.: US 11,979,204 B2
(45) Date of Patent: May 7, 2024

(54) ANTENNA ADJUSTING METHOD AND DEVICE, AND TERMINAL

(71) Applicant: VIVO MOBILE COMMUNICATION CO., LTD., Guangdong (CN)

(72) Inventor: Deng Zhao, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 125 days.

(21) Appl. No.: 17/508,859

(22) Filed: Oct. 22, 2021

(65) Prior Publication Data
US 2022/0045723 A1 Feb. 10, 2022

Related U.S. Application Data

(63) Continuation of application No. PCT/CN2020/086182, filed on Apr. 22, 2020.

(30) Foreign Application Priority Data

Apr. 24, 2019 (CN) .......................... 201910334978.4

(51) Int. Cl.
| H04B 7/04 | (2017.01) |
| H04B 1/401 | (2015.01) |
| H04B 7/0404 | (2017.01) |
| H04B 7/0413 | (2017.01) |
| H04B 17/10 | (2015.01) |

(52) U.S. Cl.
CPC .......... *H04B 7/0404* (2013.01); *H04B 1/401* (2013.01); *H04B 7/0413* (2013.01); *H04B 17/101* (2015.01)

(58) Field of Classification Search
CPC .... H04B 7/0413; H04B 17/101; H04B 1/401; H04B 7/0404
See application file for complete search history.

(56) References Cited

U.S. PATENT DOCUMENTS

| 8,625,507 B1 * | 1/2014 | Gurbuz ............... H04B 7/0871 370/329 |
| 9,553,640 B1 | 1/2017 | Chandra et al. |
| 2009/0323652 A1 * | 12/2009 | Chen ................ H04W 52/0238 370/338 |
| 2013/0035047 A1 | 2/2013 | Chen et al. |

FOREIGN PATENT DOCUMENTS

| CN | 102668408 A | 9/2012 |
| CN | 103347293 A | 10/2013 |
| CN | 103384162 A | 11/2013 |

(Continued)

OTHER PUBLICATIONS

International Search Report of International Application No. PCT/CN2020/086182 dated Jul. 8, 2020.

(Continued)

Primary Examiner — Rahel Guarino
(74) Attorney, Agent, or Firm — IP & T GROUP LLP (57) ABSTRACT

An antenna adjusting method includes: transmitting a first broadcast message in a case that a plurality of antennae are in a SISO mode, and acquiring radiation efficiencies of the plurality of antennae; and maintaining the SISO mode in a case that the radiation efficiency of at least one of the plurality of antennae is less than a preset threshold.

12 Claims, 8 Drawing Sheets

---

Transmitting a first broadcast message in a case that a plurality of antennae are in an SISO mode, and acquiring radiation efficiency of plurality of antennae — S101

Maintaining the SISO mode in a case that the radiation efficiency of at least one of the plurality of antennae is less than a preset threshold — S102

(56) References Cited

FOREIGN PATENT DOCUMENTS

| | | |
|---|---|---|
| CN | 103414507 A | 11/2013 |
| CN | 105656528 A | 6/2016 |
| CN | 109039397 A | 12/2018 |
| CN | 109150327 A | 1/2019 |
| CN | 109617587 A | 4/2019 |
| CN | 110190915 A | 8/2019 |
| DE | 102013110801 A1 | 4/2015 |

OTHER PUBLICATIONS

Written Opinion of the International Searching Authority of International Application No. PCT/CN2020/086182 dated Jul. 8, 2020.
First Office Action of Priority Application No. 201910334978.4 dated Jun. 1, 2020.
Extended European Search Report for application 20794214.5 issued by the European Patent Office dated May 18, 2022.

* cited by examiner

ANTENNA ADJUSTING METHOD AND DEVICE, AND TERMINAL

CROSS-REFERENCE TO RELATED APPLICATIONS

This application is a Bypass Continuation Application of PCT/CN2020/086182 filed on Apr. 22, 2020, which claims priority to Chinese Patent Application No. 201910334978.4 filed on Apr. 24, 2019, which are incorporated herein by reference in their entirety.

TECHNICAL FIELD

The present application relates to the technical field of wireless communication, and in particular, to an antenna adjusting method and device, and a terminal.

BACKGROUND

At present, wireless fidelity (Wi-Fi) generally adopts a multiple input multiple output (MIMO) for communication, and can increase the communication rate in a better antenna environment; however, in a relatively deteriorated antenna environment, Wi-Fi is reverted to a single input single output (SISO) mode for communication so as to improve the reliability and quality of communication.

Currently, in order to detect whether the antenna environment has deteriorated, it is a common practice to start monitoring the current antenna environment after confirming the occurrence of packet error and packet loss. Once the antenna environment is found to be deteriorated, the MIMO mode is switched to the SISO mode. Although the above method can discover the deterioration of the antenna environment, it is necessary to lose a certain amount of data. Therefore, the above method is not suitable for the use scene sensitive to the packet loss rate, for example, the application scene in voice over Wi-Fi (VoWi-Fi), thereby significantly reducing the user experience.

SUMMARY

According to a first aspect, an embodiment of the present application provides an antenna adjusting method. The antenna adjusting method is applied to a terminal and includes: transmitting a first broadcast message in a case that a plurality of antennae are in an SISO mode, and acquiring radiation efficiencies of the plurality of antennae; and maintaining the SISO mode in a case that the radiation efficiency of at least one of the plurality of antennae is less than a preset threshold.

According implementations of the first aspect of the present application, the method further includes: switching the SISO mode to an MIMO mode in a case that the radiation efficiency of each of the plurality of antennae is greater than or equal to the preset threshold.

According to any one of the above implementations of the first aspect of the present application, there are a plurality of preset thresholds, and the plurality of preset thresholds are in one-to-one correspondence with the radiation efficiencies of the plurality of antennae.

According to any one of the above implementations of the first aspect of the present application, the plurality of antennae include a first antenna and a second antenna. The step of acquiring the radiation efficiencies of the plurality of antennae includes: determining the radiation efficiency of the first antenna according to a space loss isolation between the first antenna and the second antenna, a transmitting power of the first antenna and a reflecting power of the first antenna; and determining the radiation efficiency of the second antenna according to a space loss isolation between the first antenna and the second antenna, a transmitting power of the second antenna and a reflecting power of the second antenna.

According to any one of the above implementations of the first aspect of the present application, after the step of maintaining the SISO mode, the method further includes: in the SISO mode, transmitting a second broadcast message to an external device, where the second broadcast message includes first instruction information, and the first instruction information is used to instruct external device to switch the working mode of its own antenna to the SISO mode.

According to any one of the above implementations of the first aspect of the present application, after the step of maintaining the SISO mode, the method further includes: in the SISO mode, transmitting a data packet to an external device, where the data packet includes second instruction information, second instruction information is used to instruct external device to switch the working mode of its own antenna to the SISO mode.

According to a second aspect, an embodiment of the present application provides an antenna adjusting device. The antenna adjusting device is applied to a terminal and includes: a receiving and transmitting management module, configured to transmit a first broadcast message in a case that a plurality of antennae are in an SISO mode; a radiation efficiency acquisition module, configured to acquire radiation efficiencies of the plurality of antennae; and a mode adjusting module, configured to maintain the SISO mode in a case that the radiation efficiency of at least one of the plurality of antennae is less than a preset threshold.

According to a third aspect, an embodiment of the present application provides a terminal. The terminal includes a processor, a memory, and a computer program stored in the memory and executable on the processor, where when the computer program is executed by the processor, the steps of the antenna adjusting method according to the first aspect are implemented.

DESCRIPTION OF THE DRAWINGS

The features, advantages and technical effects of the exemplary embodiments of the present application will be described below with reference to the accompanying drawings.

DETAILED DESCRIPTION OF EMBODIMENTS

The implementations of the present application are described in more detail below with reference to the accompanying drawings and embodiments. The following detailed description of the embodiments and the accompanying drawings are used to exemplarily describe the principle of the present application, but cannot be used to limit the scope of the present application, that is, the present application is not limited to the described embodiments.

Figure 1:
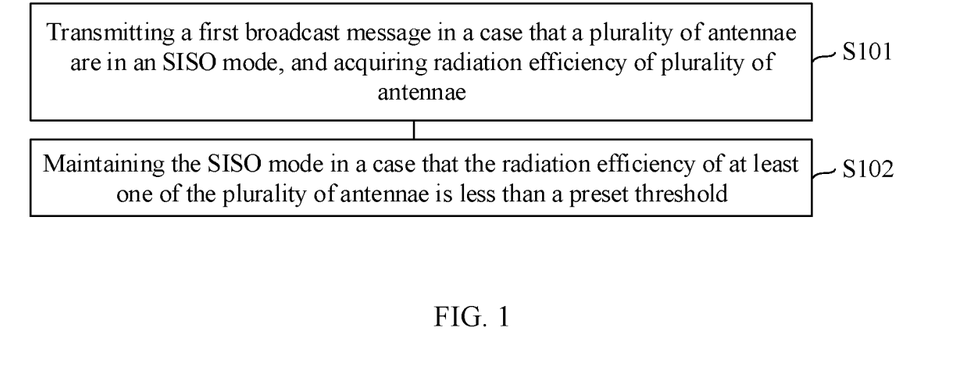
FIG. 1 is a flowchart of an antenna adjusting method according to an embodiment of the present application.

FIG. 1 is a flowchart of an antenna adjusting method according to an embodiment of the present application. As shown in FIG. 1, the antenna adjusting method may include:

S101: transmitting a first broadcast message in a case that a plurality of antennae are in an SISO mode, and acquiring radiation efficiency of plurality of antennae; and S102: maintaining the SISO mode in a case that the radiation efficiency of at least one of the plurality of antennae is less than a preset threshold.

In the embodiment of the present application, the first broadcast message is transmitted and the antenna environment where the terminal is located is acquired, that is, the radiation efficiencies of the plurality of antennae, and determination is performed based on the radiation efficiency and the preset threshold, so that the current antenna environment can be known before the terminal transmits data, and the working state of the antenna can be corrected before data transmission; therefore, the problems of data packet error and packet loss caused by the deterioration of the antenna environment are avoided. In addition, the first broadcast message is transmitted in the gap between two adjacent data transmissions without occupying the data transmission time, and a suitable mode for the data packet can be adjusted according to the current antenna environment, so that the transmission efficiency is improved.

Figure 2:
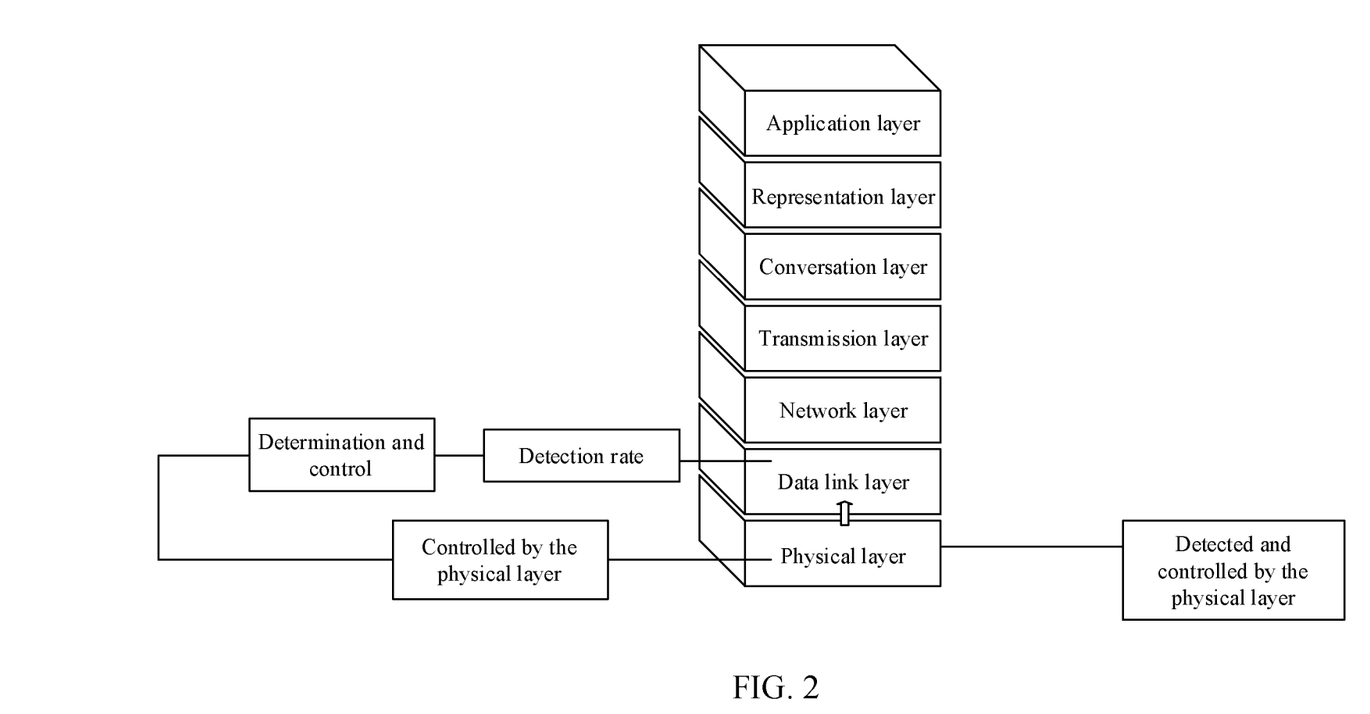
FIG. 2 is a comparison diagram between the present application and related art.

FIG. 2 is a comparison diagram between the present application and the related art. In FIG. 2, the processing process on the left side is an antenna adjusting method in the related art, and the processing process on the right side is an antenna adjusting method provided by an embodiment of the present application. In the related art, a link is detected in a data link layer, for example, data rate, bit error rate and other data are detected, and control and determination are performed based on the detected data. If the problems of packet error and packet loss are found, the physical layer controls to solve the problems of packet error and packet loss. In the embodiment of the present application, the hardware link environment of the antenna is directly detected in the physical layer, and a suitable transmission mode for each data packet is adjusted when the antenna environment deteriorates, so that the link hardware environment can be monitored in real time and it is unnecessary to spend time to detect the data rate. The transmission mode is the working mode of the plurality of antennae of the terminal.

Figure 3:
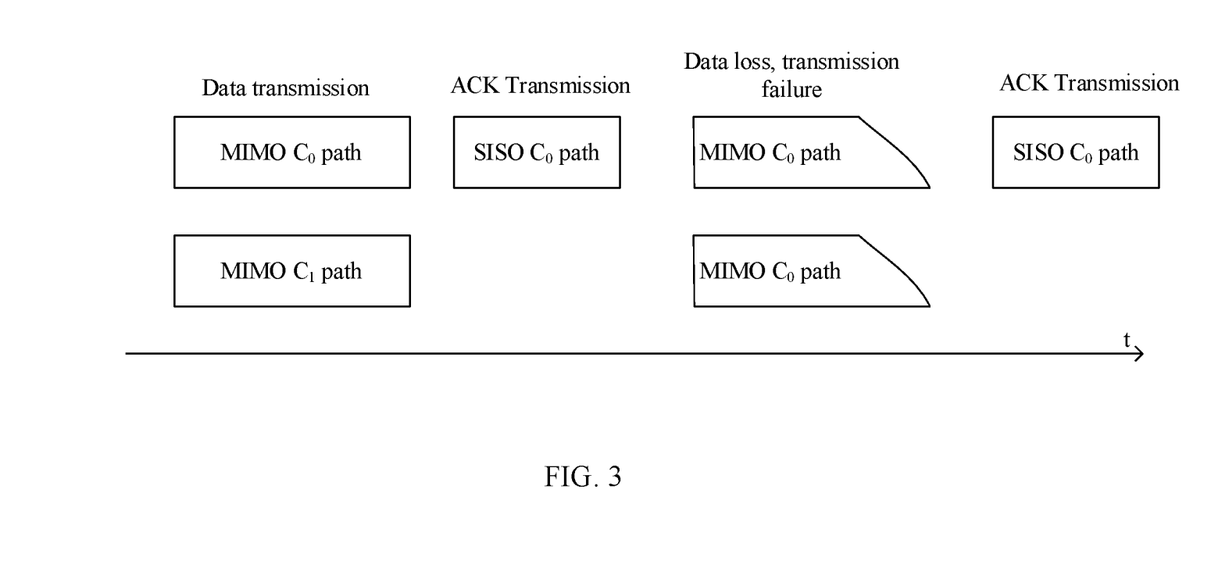
FIG. 3 is a schematic diagram of data transmission in related art.

The steps of the antenna adjusting method are described below by taking a Wi-Fi MIMO communication system as an example. FIG. 3 is a schematic diagram of data transmission in the related art. The Wi-Fi MIMO communication system includes C0-path and C1-path antennae.

As shown in FIG. 3, data is transmitted by the MIMO mode, and an acknowledge character (ACK) is transmitted by the SISO mode. In the process of transmitting data by the MIMO mode, if the communication quality is not good, there will be a situation where the ACK cannot be received, that is, packet loss is confirmed. When data is transmitted by the MIMO mode, the first broadcast message is transmitted by a lowest-level transmission protocol, that is, the SISO mode, so that the quality stability of the link is ensured.

Figure 4:
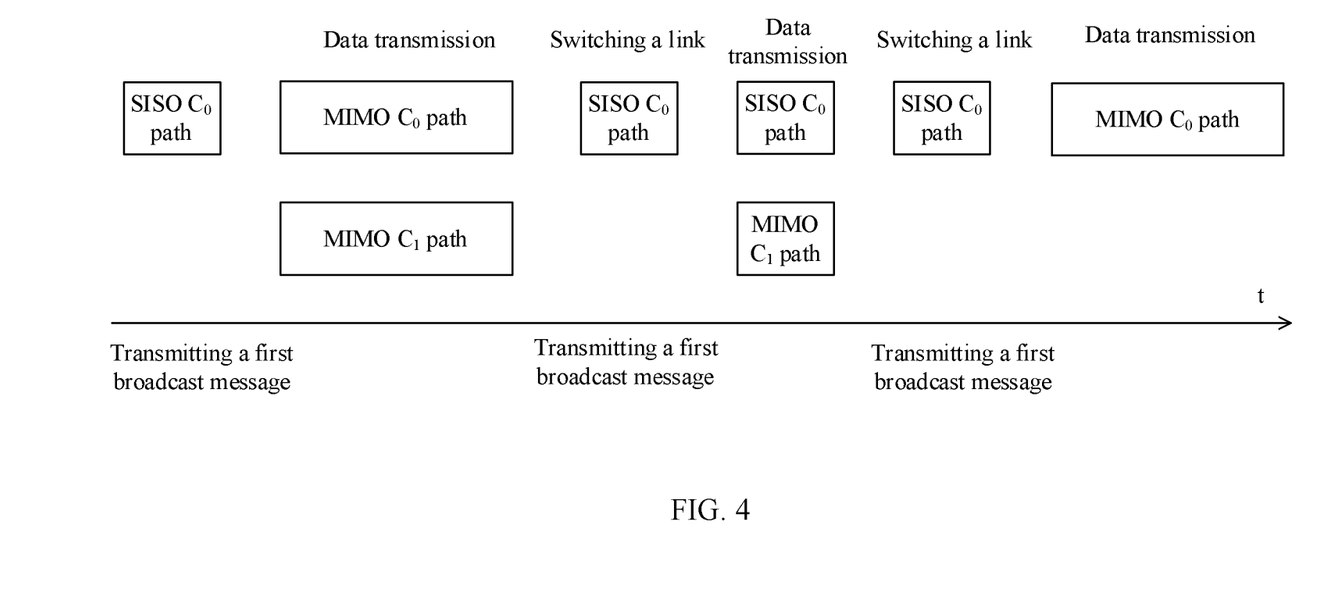
FIG. 4 is a schematic diagram of a data transmission process according to an embodiment of the present application.

FIG. 4 is a schematic diagram of a data transmission process according to an embodiment of the present application.

As shown in FIG. 4, when the first broadcast message is transmitted, if it is detected that the communication quality of the physical layer on the link is not good, that is, the antenna environment deteriorates, the next data transmission may be performed by the SISO mode.

In the embodiment of the present application, the communication quality (namely, the state of the antenna) of the physical layer on the link can be detected by transmitting the first broadcast message, the transmission mode of the to-be-transmitted data packet can be adjusted according to the communication quality, so that a suitable transmission mode for the data packet can be adjusted according to the communication quality, and the transmission efficiency can be improved.

In addition, in the embodiment of the present application, the state of the antenna is detected by transmitting the first broadcast message, which does not occupy the data transmission time, and detection is performed every time the broadcast message is sent, so that each data packet can have a change to select a suitable transmission mode. Therefore, the problem of packet loss caused by the deterioration of the state of the antenna may be solved.

In some embodiments of the present application, as described in S102, the SISO mode is maintained if the radiation efficiency of at least one of the plurality of antennae is less than the preset threshold.

Referring to FIG. 4, when the radiation efficiency of at least one of the plurality of antennae is less than the preset threshold, it instructs that the antenna environment deteriorates, then the first broadcast message is transmitted by the SISO mode. After a response message transmitted by the external device is received, the data packet is transmitted to the external device by continuously using the SISO mode.

In some embodiments of the present application, after S102, the antenna adjusting method further includes:

switching the SISO mode to an MIMO mode in a case that the radiation efficiency of each of the plurality of antennae is greater than or equal to the preset threshold.

The step may include: continuing to transmit a first broadcast message after the previous data transmission and acquiring the radiation efficiency of the current plurality of antennae; and switching the SISO mode to the MIMO mode in a case that the radiation efficiency of each of the plurality of antennae is greater than or equal to the preset threshold. In addition, the first broadcast message may be transmitted in a data transmission time slot (that is, a time interval between two data transmissions), or the first broadcast message may be transmitted first before data is sent.

Figure 5:
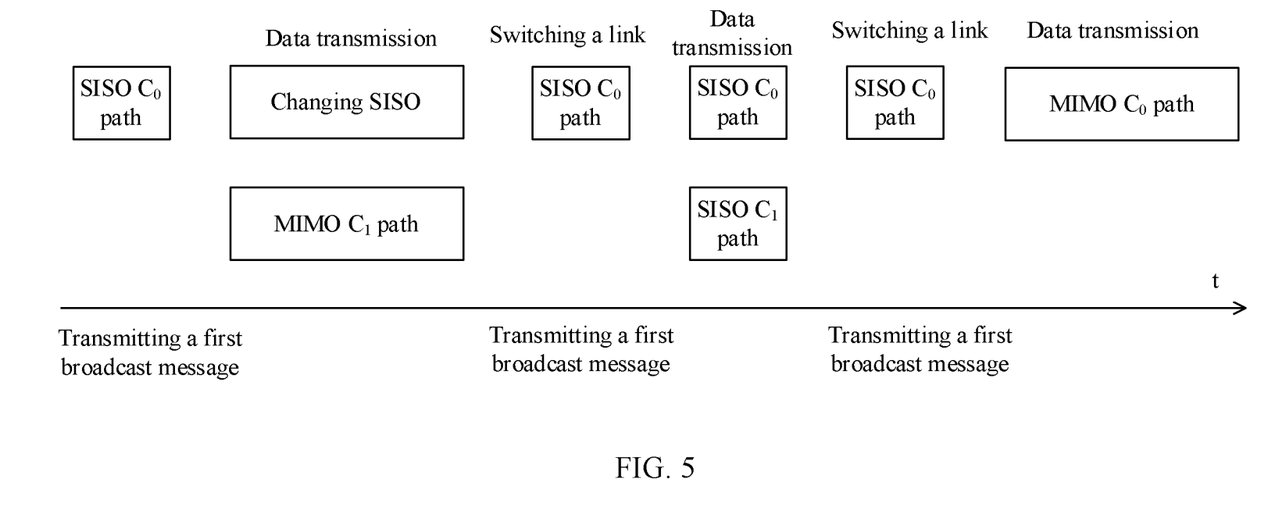
FIG. 5 is a schematic diagram of another data transmission process according to an embodiment of the present application.

FIG. 5 is a schematic diagram of another data transmission process according to an embodiment of the present application.

Referring to FIG. 5, the first broadcast message is transmitted by the SISO mode and the radiation efficiencies of the current plurality of antennae are acquired. If the radiation efficiency of each of the plurality of is greater than or equal to the preset threshold, the antenna mode is switched from the SISO mode to the MIMO mode before the next data packet transmission. The MIMO communication system includes C0-path and C1-path antennae.

In addition, in the related art, the terminal will try to use the MIMO mode to transmit data again after using the SISO mode to transmit data for a period of time. If still failed, the terminal will continue to use the SISO mode to transmit data. Or the terminal will monitor the intensity of the signal in the data transmission process to determine whether to use the MIMO mode. If failing to try to use the MIMO mode to transmit data, the terminal will continue to use the SISO mode to transmit data.

In some embodiments of the present application, in S102, there are a plurality of preset thresholds, and each preset threshold corresponds to the radiation efficiency of one of the plurality of antennae. The preset threshold may be set based on whether packet is lost in the current antenna environment, or may be set based on whether the user experience is affected.

In some embodiments of the present application, the step of acquiring the radiation efficiencies of the plurality of antennae may include:
  determining the radiation efficiency of a first antenna according to a space loss isolation between any two of the plurality of antennae, a transmitting power of the first antenna of the any two antennae and a reflecting power of the first antenna;
  and determining the radiation efficiency of a second antenna according to a space loss isolation between any two of the plurality of antennae, a transmitting power of the second antenna of the any two antennae and a reflecting power of the second antenna. In some embodiments, the plurality of antennae include a first antenna and a second antenna. Correspondingly, the step of acquiring the radiation efficiencies of the plurality of antennae may include:
  determining the radiation efficiency of the first antenna according to a space loss isolation between the first antenna and the second antenna, a transmitting power of the first antenna and a reflecting power of the first antenna; and determining the radiation efficiency of the second antenna according to a space loss isolation between the first antenna and the second antenna, a transmitting power of the second antenna and a reflecting power of the second antenna.

In some embodiments of the present application, the plurality of antennae may include 2×2MIMO and 4×4MIMO. For the convenience of description, the follow will use the 2×2MIMO antenna as an example for description.

The radiation efficiencies of the plurality of antennae include the radiation efficiencies between any two antennae, then 2×2MIMO may include four radiation efficiencies, and each preset threshold corresponds to one radiation efficiency.

Figure 6:
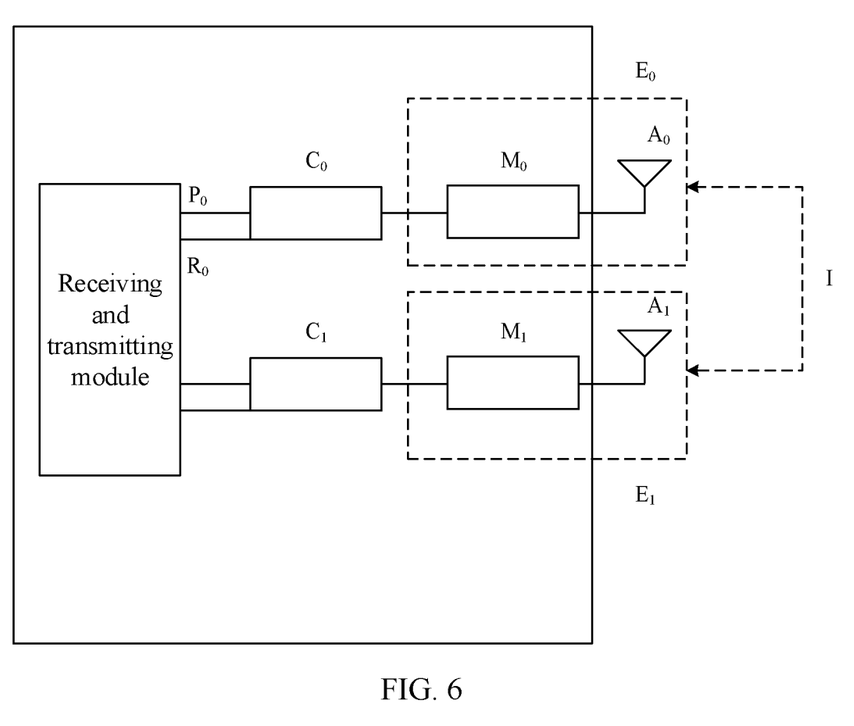
FIG. 6 is a schematic diagram of a 2×2MIMO system according to an embodiment of the present application.

FIG. 6 is a schematic diagram of a 2×2MIMO system according to an embodiment of the present application.

In FIG. 6, the 2×2MIMO has two antennae A0 and A1, which are connected to respective matched circuits M0 and M1; and the total efficiency of a radiation unit formed by the antennae and the matched circuits is E0. For example, the antenna A0 is connected to the matched circuit M0, the total efficiency of the radiation unit formed by the antenna A0 and the matched circuit M0 is E0, the antenna A1 is connected to the matched circuit M1, and the total efficiency of the radiation unit formed by the antenna A1 and the matched circuit M1 is E1. A space loss isolation from the space of the antenna A0 to the space of the antenna A1 is I. Reflecting coefficients of the matched circuit M0 and the matched circuit M1 are R0 and R1 respectively. Directional couplers C0 and C1 are arranged on each link. For example, the directional coupler C0 is arranged on the link corresponding to the antenna A0, the directional coupler C1 is arranged on the link corresponding to the antenna A1, and the power reflected by the matched circuit and the energy of a signal received by the link are detected.

When the receiving and transmitting management module transmits the first broadcast message, the power of data transmitted by the C0 path, namely the link corresponding to the antenna A0 is P0, one part of the C0 path at the matched circuit M0 will reflect, a reflecting power R0 may be acquired through the directional coupler, one part is transmitted to the corresponding space through the antenna A0, and the power radiated to the space is P0×E0. Since the isolation between two antennae has been determined after product design is completed, the space loss isolation I is also known. The detectable power on the C1 path, namely the link corresponding to the antenna A1, is represented as R1, and the following formula may be obtained:

$$R0 = P0 \times (1 - E0)$$

$$R1 = (P0 \times E0 - I) \times E1.$$

The following may be obtained by the above formulas:
  the radiation efficiency E0 of the first antenna is equal to 1−R0/P0;
  the radiation efficiency E1 of the second antenna is equal to R1/(P0−R0−I).

Then, whether it is necessary to adjust the transmission mode of the current antenna may be determined according to the radiation efficiencies of the two antennae and the preset threshold set in the terminal.

If the antenna environment of the antenna A1 deteriorates, that is, the radiation efficiency of the antenna A1 is less than the preset threshold, the MIMO mode may be switched to the SISO mode of the antenna A0 for transmission before the next data transmission. On the contrary, if the antenna environment of the antenna A0 deteriorates, that is, the radiation efficiency of the antenna A0 is less than the preset threshold, the MIMO mode may be switched to the SISO mode of the antenna A1 for transmission before the next data transmission. In this way, the antenna environment is known in advance, the transmission mode is switched in advance when the antenna environment deteriorates, and the problem of poor user experience caused by data packet loss is avoided.

Currently, there is generally one main antenna among the plurality of antennae. When the antenna environment deteriorates, the main antenna is in a working state by default. The C0 path in each of FIG. 3, FIG. 4 and FIG. 5 is a link where the main antenna is located. At this time, there will be an SISO time slot on the C0 path.

In some embodiments of the present application, in a case that the working mode of the terminal changes, the external device will be informed by the following ways, so that the external device will switch the working mode to the same working mode as the terminal.

The external device needs to be informed to switch the working mode under the following situations:
  first situation: in the SISO mode, a second broadcast message is transmitted to the external device, where the second broadcast message includes first instruction information, and the first instruction information is used to instruct the external device to switch the working mode of its own plurality of antennae to the SISO mode.

In the process of transmitting data by the terminal and the external device, there may be a situation where a plurality of broadcast messages are transmitted. At this time, the change of the working state of the terminal may be informed to the external device through the first instruction information in the second broadcast message when the second broadcast message (the message continuously transmitted after the first broadcast message is sent) is sent, and the external device switches to the same working mode as the terminal after receiving the second broadcast message, thereby facilitating the subsequent data transmission.

The second situation: in the SISO mode, a data packet is transmitted to the external device, where the data packet (which is a next data packet transmitted after the first broadcast message is transmitted) includes second instruction information, and the second instruction information is used to instruct the external device to switch the working mode of its own plurality of antennae to the SISO mode.

Data may be directly transmitted after the terminal transmits the first broadcast message to the external device and receives the response message transmitted by the external device. At this time, the second instruction information may be increased in the data packet, where a packet head of the data packet may carry the second instruction information.

In the embodiment of the present application, the broadcast message may be ACK, and at this time, the response message of the external device may also be ACK; and the broadcast message may also be a beacon.

In some embodiments of the present application, the external device may be a device including a plurality of antennae, such as a router, a terminal, a base station and the like.

In addition, the broadcast message will also carry the ID of the external device, and the external device corresponding to the ID will transmitted a response message after receiving the broadcast message; and if the broadcast message is not received by the external device corresponding to the ID, the broadcast message can be discarded.

Figure 7:
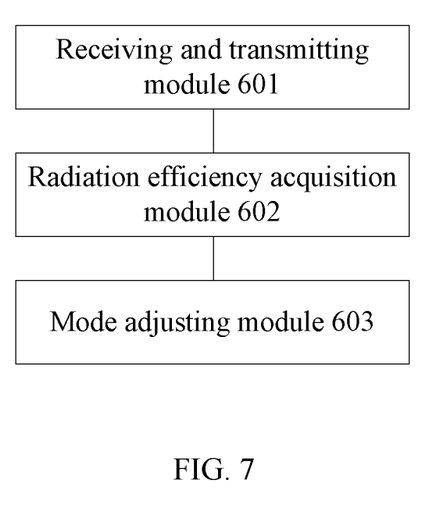
FIG. 7 is a schematic diagram of an antenna adjusting device according to an embodiment of the present application.

FIG. 7 is a schematic diagram of an antenna adjusting device according to an embodiment of the present application. As shown in FIG. 7, the antenna adjusting device includes:
- a receiving and transmitting management module 601, configured to transmit a first broadcast message in a case that a plurality of antennae are in an SISO mode;
- a radiation efficiency acquisition module 602, configured to acquire the radiation efficiency of the plurality of antennae; and
- a mode adjusting module 603, configured to maintain the SISO mode in a case that the radiation efficiency of at least one of the plurality of antennae is less than a preset threshold.

In the embodiment of the present application, the first broadcast message is transmitted and the antenna environment where the terminal is located is acquired, that is, the radiation efficiencies of the plurality of antennae, and determination is performed based on the radiation efficiency and the preset threshold, so that the current antenna environment can be known before the terminal transmits data, and the working state of the antenna can be corrected before data transmission; therefore, the problems of data packet error and packet loss caused by the deterioration of the antenna environment are avoided. In addition, the first broadcast message is transmitted in the gap between two adjacent data transmissions without occupying the data transmission time, and a suitable mode for the data packet can be adjusted according to the current antenna environment, so that the transmission efficiency is improved.

In some embodiments of the present application, the mode adjusting module 603 is further configured to: switch the SISO mode to an MIMO mode in a case that the radiation efficiency of each of the plurality of antennae is greater than or equal to the preset threshold.

In some embodiments of the present application, there are a plurality of preset thresholds, and the plurality of preset thresholds are in one-to-one correspondence with the radiation efficiencies of the plurality of antennae.

In some embodiments of the present application, the plurality of antennae include a first antenna and a second antenna. The radiation efficiency acquisition module 602 may be configured to:
- determining the radiation efficiency of the first antenna according to a space loss isolation between the first antenna and the second antenna, a transmitting power of the first antenna and a reflecting power of the first antenna; and determining the radiation efficiency of the second antenna according to a space loss isolation between the first antenna and the second antenna, a transmitting power of the second antenna and a reflecting power of the second antenna.

In some embodiments of the present application, the radiation efficiency of the first antenna is: $E0=I-R0/P0$, and the radiation efficiency of the second antenna is: $E1=R1/(P0-R0-I)$,
where R0 is a feedback coefficient of a matched circuit of the first antenna, P0 is a transmitting power of a directional coupler of the first antenna, R1 is a feedback coefficient of a matched circuit of the second antenna, and I is a space loss isolation.

In some embodiments of the present application, the receiving and transmitting management module 601 is further configured to: transmit a second broadcast message to an external device in an SISO mode, where the second broadcast message is used to instruct other terminals to switch the working mode of their own antennae to the SISO mode.

In some embodiments of the present application, the receiving and transmitting management module 601 is further configured to: transmit a data packet to an external device in an SISO mode, where the data packet includes instruction information, and the instruction information is used to instruct the external device to switch the working mode of its own antenna to the SISO mode.

The terminal provided by the embodiments of the present application can implement various processes implemented by the terminal in the method embodiment in FIG. 1. To avoid repetition, details are not described herein again.

In the embodiment of the present application, the first broadcast message is transmitted and the antenna environment where the terminal is located is acquired, that is, the radiation efficiencies of the plurality of antennae, and determination is performed based on the radiation efficiency and the preset threshold, so that the current antenna environment can be known before the terminal transmits data, and the working state of the antenna can be corrected before data transmission; therefore, the problems of data packet error and packet loss caused by the deterioration of the antenna environment are avoided. In addition, the first broadcast message is transmitted in the gap between two adjacent data transmissions without occupying the data transmission time, and a suitable mode for the data packet can be adjusted according to the current antenna environment, so that the transmission efficiency is improved.

Figure 8:
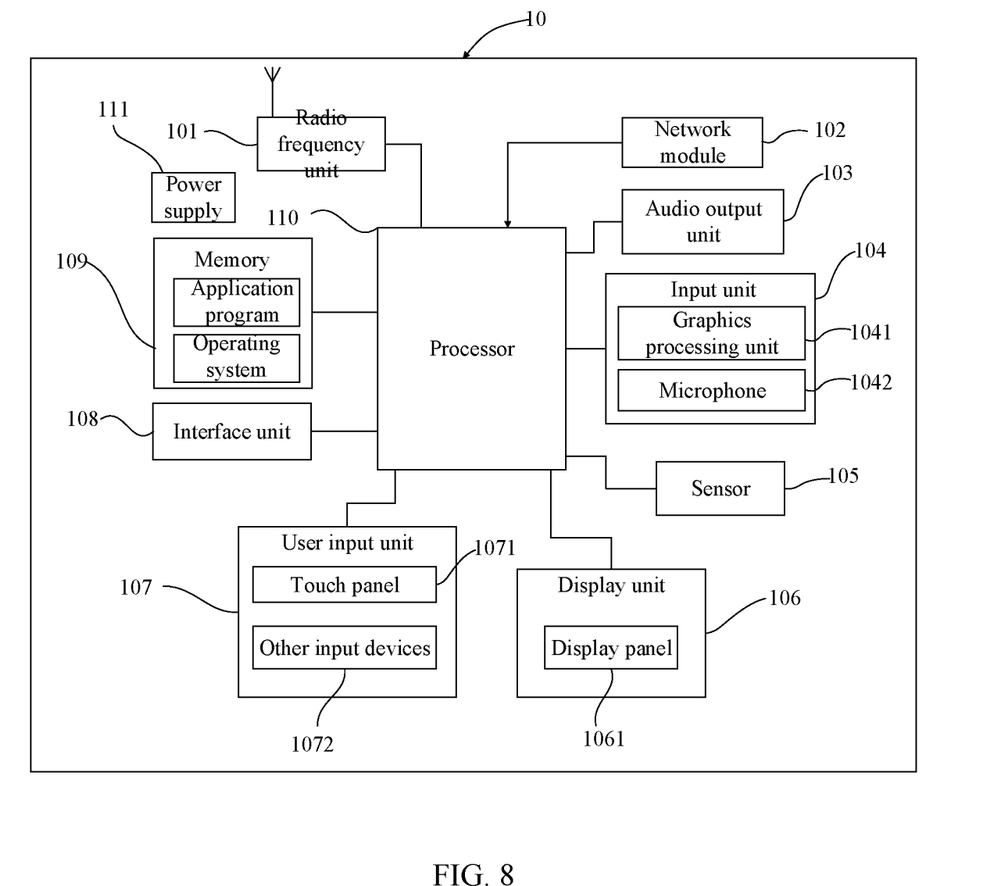
FIG. 8 is a schematic diagram of a hardware structure of a terminal according to embodiments of the present application.

FIG. 8 is a schematic diagram of a hardware structure of a terminal according to embodiments of the present application.

The terminal 10 includes, but is not limited to: components such as a radio frequency unit 101, a network module 102, an audio output unit 103, an input unit 104, a sensor 105, a display unit 106, a user input unit 107, an interface unit 108, a memory 109, a processor 110, and a power supply 111. Those skilled in the art may understand that the terminal structure shown in FIG. 8 does not constitute a limitation to the terminal. The terminal may include more or fewer components than those shown in the figure, or some components may be combined, or there may be a different component arrangement. In this embodiment of this application, the terminal includes, but not limited to, a mobile phone, a tablet computer, a notebook computer, a palmtop computer, a vehicle-mounted terminal, a wearable device, a pedometer, or the like.

The processor 110 is configured to: transmit a first broadcast message in a case that a plurality of antennae are in an SISO mode, acquire radiation efficiencies of the plurality of antennae, and maintain the SISO mode in a case that the radiation efficiency of at least one of the plurality of antennae is less than a preset threshold.

In the embodiment of the present application, the first broadcast message is transmitted and the antenna environment where the terminal is located is acquired, that is, the radiation efficiencies of the plurality of antennae, and determination is performed based on the radiation efficiency and the preset threshold, so that the current antenna environment can be known before the terminal transmits data, and the working state of the antenna can be corrected before data transmission; therefore, the problems of data packet error and packet loss caused by the deterioration of the antenna environment are avoided. In addition, the first broadcast message is transmitted in the gap between two adjacent data transmissions without occupying the data transmission time, and a suitable mode for the data packet can be adjusted according to the current antenna environment, so that the transmission efficiency is improved.

It should be understood that, in this embodiment of this application, the radio frequency unit 101 may be configured to receive and transmit information, or receive and transmit signals during a call. For example, the radio frequency unit 101 receives downlink data from a base station, and transmits the downlink data to the processor 110 for processing; and in addition, transmits uplink data to the base station. Generally, the radio frequency unit 101 includes, but is not limited to, an antenna, at least one amplifier, a transceiver, a coupler, a low noise amplifier, and a duplexer, and the like. In addition, the radio frequency unit 101 may further communicate with a network and another device by using a wireless communication system.

The terminal provides wireless broadband Internet access for a user by using the network module 102, for example, helping the user transmit and receive an email, browse a web page, and access streaming media.

The audio output unit 103 may convert audio data received by the radio frequency unit 101 or the network module 102 or stored in the memory 109 into an audio signal, and output the audio signal into sound. Moreover, the audio output unit 103 may further provide audio output related to a specific function performed by the terminal 10 (such as a call signal reception sound, a message reception sound, or the like). The audio output unit 103 includes a loudspeaker, a buzzer, a receiver, and the like.

The input unit 104 is configured to receive audio or video signals. The input unit 104 may include a graphics processing unit (GPU) 1041 and a microphone 1042. The graphics processing unit 1041 processes image data of a static picture or a video obtained by an image capturing apparatus (for example, a camera) in a video capturing mode or an image capturing mode. A processed image frame may be displayed on the display unit 106. The image frame processed by the graphics processing unit 1041 may be stored in the memory 109 (or another storage medium) or transmitted via the radio frequency unit 101 or the network module 102. The microphone 1042 may receive sound and may process such sound into audio data. The processed audio data may be converted, in a call mode, into a format that may be transmitted to a mobile communication base station by using the radio frequency unit 101 for output.

The terminal 10 further includes at least one sensor 105, such as a light sensor, a motion sensor, and other sensors. For example, the light sensor includes an ambient light sensor and a proximity sensor. The ambient light sensor may adjust luminance of the display panel 1061 based on brightness of ambient light. The proximity sensor may turn off the display panel 1061 and/or backlight when the terminal 10 moves to an ear. As a type of motion sensor, an accelerometer sensor can detect magnitudes of accelerations in all directions (usually three axes), can detect a magnitude and a direction of gravity in a static state, and can be applied to terminal posture recognition (such as screen switching between portrait and landscape, related games, and magnetometer posture calibration), functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information inputted by a user or information provided to a user. The display unit 106 may include a display panel 1061, and the display panel 1061 may be configured in a form of a liquid crystal display (LCD), an organic light-emitting diode (OLED), or the like.

The user input unit 107 may be configured to receive input digit or character information and generate key signal input related to user setting and function control of the terminal. For example, the user input unit 107 includes a touch panel 1071 and other input devices 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection device and a touch controller. The touch detection device detects a touch position of a user, detects a signal brought by a touch operation, and transmits the signal to the touch controller. The touch controller receives touch information from the touch detection apparatus, converts the touch information into contact coordinates, sends the contact coordinates to the processor 110, and receives and executes a command from the processor 110. In addition, the touch panel 1071 may be implemented by various types such as a resistive type, a capacitive type, an infrared ray type or a surface acoustic wave type. In addition to the touch panel 1071, the user input unit 107 may further include other input devices 1072. The other input devices 1072 may include, but are not limited to, a physical keyboard, a function key (for example, a volume control key or a switch key), a trackball, a mouse, and a joystick. Details are not described herein again.

Optionally, the touch panel 1071 may cover the display panel 1061. When detecting the touch operation on or near the touch panel 1071, the touch panel 1071 transmits the touch operation to the processor 110 to determine a type of a touch event, and then the processor 110 provides corresponding visual output on the display panel 1061 based on the type of the touch event. Although the touch panel 1071 and the display panel 1061 are used as two separate components to implement input and output functions of the terminal in FIG. 8, in some embodiments, the touch panel 1071 and the display panel 1061 may be integrated to implement the input and output functions of the terminal. This is not specifically limited herein.

The interface unit 108 is an interface for connecting an external device to the terminal 10. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 108 may be configured to receive an input (for example, data information or power) from an external apparatus and transmit the received input to one or more elements in the terminal 10, or transmit data between the terminal 10 and the external apparatus.

The memory 109 may be configured to store software programs and various data. The memory 109 may mainly include a program storage area and a data storage area. The program storage area may store an operating system, an application required for at least one function (for example, a sound playback function or an image playback function), and the like. The data storage area may store data (for example, audio data or an address book) or the like created based on use of the mobile phone. In addition, the memory 109 may include a high-speed random access memory, or may include a nonvolatile memory, for example, at least one disk storage device, a flash memory, or another volatile solid-state storage device.

The processor 110 is a control center of the terminal, and connects all parts of the entire terminal by using various interfaces and lines. By running or executing a software program and/or a module stored in the memory 109 and invoking data stored in the memory 109, the processor performs various functions of the terminal and data processing, to perform overall monitoring on the terminal. The processor 110 may include one or more processing units. The processor 110 may be integrated with an application processor and a modem processor, where the application processor mainly processes an operating system, a user interface, an application program and the like, and the modem processor mainly processes wireless communication. It may be understood that the above-mentioned modem processor may not be integrated in the processor 110.

The terminal 10 may further include the power supply 111 (for example, a battery) configured to supply power to various components. The power supply 111 may be logically connected to the processor 110 through a power management system, so as to implement functions such as managing charging, discharging, and power consumption through the power management system.

In addition, the terminal 10 includes some function modules that are not shown, which are not elaborated here.

The embodiment of the present application further provides a terminal, including a processor 110, a memory 109, and a computer program stored in the memory 109 and executable on the processor 110, where when the computer program is executed by the processor 110, various processes of the antenna adjusting method embodiment are implemented, and a same technical effect can be achieved. To avoid repetition, details are not described herein again.

The embodiment of the present application further provides a non-transitory computer readable storage medium. The non-transitory computer readable storage medium stores a computer program. When the computer program is executed by a processor, various processes of the antenna adjusting method embodiment are implemented, and a same technical effect can be achieved. To avoid repetition, details are not described herein again. The non-transitory computer readable storage medium includes a read-only memory (ROM), a random access memory (RAM), a magnetic disk, or an optical disc.

In this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. In the absence of more restrictions, an element defined by the statement "including a . . . " does not exclude another same element in a process, method, article, or device that includes the element.

Based on the foregoing descriptions of the embodiments, a person skilled in the art may clearly understand that the method in the foregoing embodiment may be implemented by software in addition to a necessary universal hardware platform or only by hardware. In most circumstances, the former is a preferred implementation manner. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from the protection scope of aims of this application and claims, all of which fall within the protection of this application.

What is claimed is:

1. An antenna adjusting method, applied to a terminal, wherein the terminal comprises a plurality of antennae, and the method comprises:

transmitting a first broadcast message in a case that the terminal is in a single input single output (SISO) mode, and acquiring radiation efficiencies of the plurality of antennae; and maintaining the SISO mode in a case that a radiation efficiency of at least one of the plurality of antennae is less than a preset threshold; wherein there are a plurality of preset thresholds, and the plurality of preset thresholds are in one-to-one correspondence with the radiation efficiencies of the plurality of antennae; and the plurality of antennae comprises a first antenna and a second antenna; and the acquiring the radiation efficiencies of the plurality of antennae comprises:
  determining a radiation efficiency of the first antenna, according to a space loss isolation between the first antenna and the second antenna, a transmitting power of the first antenna and a reflecting power of the first antenna, and
  determining a radiation efficiency of the second antenna, according to the space loss isolation between the first antenna and the second antenna, a transmitting power of the second antenna and a reflecting power of the second antenna.

2. The method according to claim 1, further comprising:
  switching the SISO mode to a multiple input multiple output (MIMO) mode in a case that the radiation efficiency of each of the plurality of antennae is greater than or equal to the preset threshold.

3. The method according to claim 1, wherein after the maintaining the SISO mode, the method further comprises:
  in the SISO mode, transmitting a second broadcast message to an external device, wherein the second broadcast message comprises first instruction information, and the first instruction information is used to instruct the external device to switch working mode of antenna of the external device to the SISO mode.

4. The method according to claim 1, wherein after the maintaining the SISO mode, the method further comprises:
  in the SISO mode, transmitting a data packet to an external device, wherein the data packet comprises second instruction information, and the second instruction information is used to instruct the external device to switch a working mode of antenna of the external device to the SISO mode.

5. A terminal, comprising a plurality of antennae, a processor, a memory, and a computer program stored in the memory and executable on the processor, wherein the computer program, when executed by the processor, causes the terminal to perform:
  transmitting a first broadcast message in a case that the terminal is in a single input single output (SISO) mode, and acquiring radiation efficiencies of the plurality of antennae; and
  maintaining the SISO mode in a case that a radiation efficiency of at least one of the plurality of antennae is less than a preset threshold; wherein
  there are a plurality of preset thresholds, and the plurality of preset thresholds are in one-to-one correspondence with the radiation efficiencies of the plurality of antennae; and
  the plurality of antennae comprises a first antenna and a second antenna; and
the computer program, when executed by the processor, causes the terminal to perform:
  determining a radiation efficiency of the first antenna, according to a space loss isolation between the first antenna and the second antenna, a transmitting power of the first antenna and a reflecting power of the first antenna, and
  determining a radiation efficiency of the second antenna, according to the space loss isolation between the first antenna and the second antenna, a transmitting power of the second antenna and a reflecting power of the second antenna.

6. The terminal according to claim 5, wherein the computer program, when executed by the processor, causes the terminal to further perform:
  switching the SISO mode to a multiple input multiple output (MIMO) mode in a case that the radiation efficiency of each of the plurality of antennae is greater than or equal to the preset threshold.

7. The terminal according to claim 5, wherein the computer program, when executed by the processor, causes the terminal to further perform:
  in the SISO mode, transmitting a second broadcast message to an external device, wherein the second broadcast message comprises first instruction information, and the first instruction information is used to instruct the external device to switch working mode of antenna of the external device to the SISO mode.

8. The terminal according to claim 5, wherein the computer program, when executed by the processor, causes the terminal to further perform
  in the SISO mode, transmitting a data packet to an external device, wherein the data packet comprises second instruction information, and the second instruction information is used to instruct the external device to switch a working mode of antenna of the external device to the SISO mode.

9. A non-transitory computer readable storage medium, storing a computer program, wherein the computer program, when executed by a processor of a terminal that comprises a plurality of antennae, causes the terminal to perform:
  transmitting a first broadcast message in a case that the terminal is in a single input single output (SISO) mode, and acquiring radiation efficiencies of the plurality of antennae; and
  maintaining the SISO mode in a case that a radiation efficiency of at least one of the plurality of antennae is less than a preset threshold; wherein
  there are a plurality of preset thresholds, and the plurality of preset thresholds are in one-to-one correspondence with the radiation efficiencies of the plurality of antennae; and
  the plurality of antennae comprises a first antenna and a second antenna; and
the computer program, when executed by the processor, causes the terminal to perform:
  determining a radiation efficiency of the first antenna, according to a space loss isolation between the first antenna and the second antenna, a transmitting power of the first antenna and a reflecting power of the first antenna, and
  determining a radiation efficiency of the second antenna, according to the space loss isolation between the first antenna and the second antenna, a transmitting power of the second antenna and a reflecting power of the second antenna.

10. The non-transitory computer readable storage medium according to claim 9, wherein the computer program, when executed by the processor, causes the terminal to further perform:
  switching the SISO mode to a multiple input multiple output (MIMO) mode in a case that the radiation efficiency of each of the plurality of antennae is greater than or equal to the preset threshold.

11. The non-transitory computer readable storage medium according to claim 9, wherein the computer program, when executed by the processor, causes the terminal to further perform:
  in the SISO mode, transmitting a second broadcast message to an external device, wherein the second broadcast message comprises first instruction information, and the first instruction information is used to instruct the external device to switch working mode of antenna of the external device to the SISO mode.

12. The non-transitory computer readable storage medium according to claim 9, wherein the computer program, when executed by the processor, causes the terminal to further perform
in the SISO mode, transmitting a data packet to an external device, wherein the data packet comprises second instruction information, and the second instruction information is used to instruct the external device to switch a working mode of antenna of the external device to the SISO mode.

* * * * *